(12) United States Patent
Kim et al.

(10) Patent No.: US 11,265,948 B2
(45) Date of Patent: Mar. 1, 2022

(54) METHOD FOR RECOVERING LINK BETWEEN TERMINALS IN WIRELESS COMMUNICATION SYSTEM, AND DEVICE THEREFOR

(71) Applicant: LG Electronics Inc., Seoul (KR)

(72) Inventors: Heejin Kim, Seoul (KR); Ilmu Byun, Seoul (KR); Heejeong Cho, Seoul (KR); Genebeck Hahn, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/479,149

(22) PCT Filed: Jan. 20, 2017

(86) PCT No.: PCT/KR2017/000715
§ 371 (c)(1),
(2) Date: Jul. 18, 2019

(87) PCT Pub. No.: WO2018/135677
PCT Pub. Date: Jul. 26, 2018

(65) Prior Publication Data
US 2019/0394827 A1    Dec. 26, 2019

(51) Int. Cl.
*H04W 76/19*    (2018.01)
*H04W 4/46*    (2018.01)
(Continued)

(52) U.S. Cl.
CPC ........... *H04W 76/19* (2018.02); *H04L 5/0055* (2013.01); *H04W 4/46* (2018.02); *H04W 24/10* (2013.01);
(Continued)

(58) Field of Classification Search
CPC ....... H04W 76/23; H04W 76/19; H04W 4/46; H04W 76/18; H04W 24/10; H04W 72/042; H04W 80/08; H04L 5/0055
See application file for complete search history.

(56) References Cited

U.S. PATENT DOCUMENTS

2013/0272182 A1* 10/2013 Li ..................... H04L 5/0023
370/311
2015/0282243 A1    10/2015 Lei et al.
(Continued)

FOREIGN PATENT DOCUMENTS

KR    1020140138235    12/2014
WO    WO-2015016567 A1 *  2/2015    ........ H04W 72/0473
WO    2016153774    9/2016

*Primary Examiner* — Omer S Mian
(74) *Attorney, Agent, or Firm* — Dentons US LLP

(57) ABSTRACT

The present invention provides a method for re-establishing a link between terminals in a wireless communication system, and a device therefor. Particularly, the method for a first terminal to re-establish a link with another terminal in a wireless communication system comprises: a step of determining a radio link failure with respect to a radio link with a second terminal; a step of transmitting a first message, requesting measurement for re-establishing the radio link with the second terminal, to a base station on the basis of the determined radio link failure; a step of receiving a second message, including information on the configuration of the measurement, from the base station in response to the transmitted first message; and a step of transmitting, to the base station, a third message including a report on the radio link with the second terminal which has been re-established by performing the measurement based on the information on the configuration.

12 Claims, 8 Drawing Sheets

(51) Int. Cl.
  *H04W 76/18*   (2018.01)
  *H04L 5/00*    (2006.01)
  *H04W 24/10*   (2009.01)
  *H04W 72/04*   (2009.01)
  *H04W 80/08*   (2009.01)

(52) U.S. Cl.
  CPC ......... *H04W 72/042* (2013.01); *H04W 76/18* (2018.02); *H04W 80/08* (2013.01)

(56) References Cited

U.S. PATENT DOCUMENTS

| | | | |
|---|---|---|---|
| 2015/0289307 A1* | 10/2015 | Li | H04W 76/14 370/329 |
| 2016/0044678 A1* | 2/2016 | Kwon | H04W 28/0278 370/329 |
| 2016/0198504 A1* | 7/2016 | Seo | H04W 72/0473 370/329 |
| 2016/0285935 A1 | 9/2016 | Wu et al. | |
| 2017/0006560 A1 | 1/2017 | Siomina et al. | |
| 2017/0156136 A1* | 6/2017 | Tavildar | H04W 4/70 |
| 2018/0206286 A1* | 7/2018 | Pragada | H04W 76/14 |
| 2019/0020987 A1* | 1/2019 | Khoryaev | H04W 72/1205 |
| 2020/0092897 A1* | 3/2020 | Xu | H04W 4/00 |

* cited by examiner

[FIG. 1]
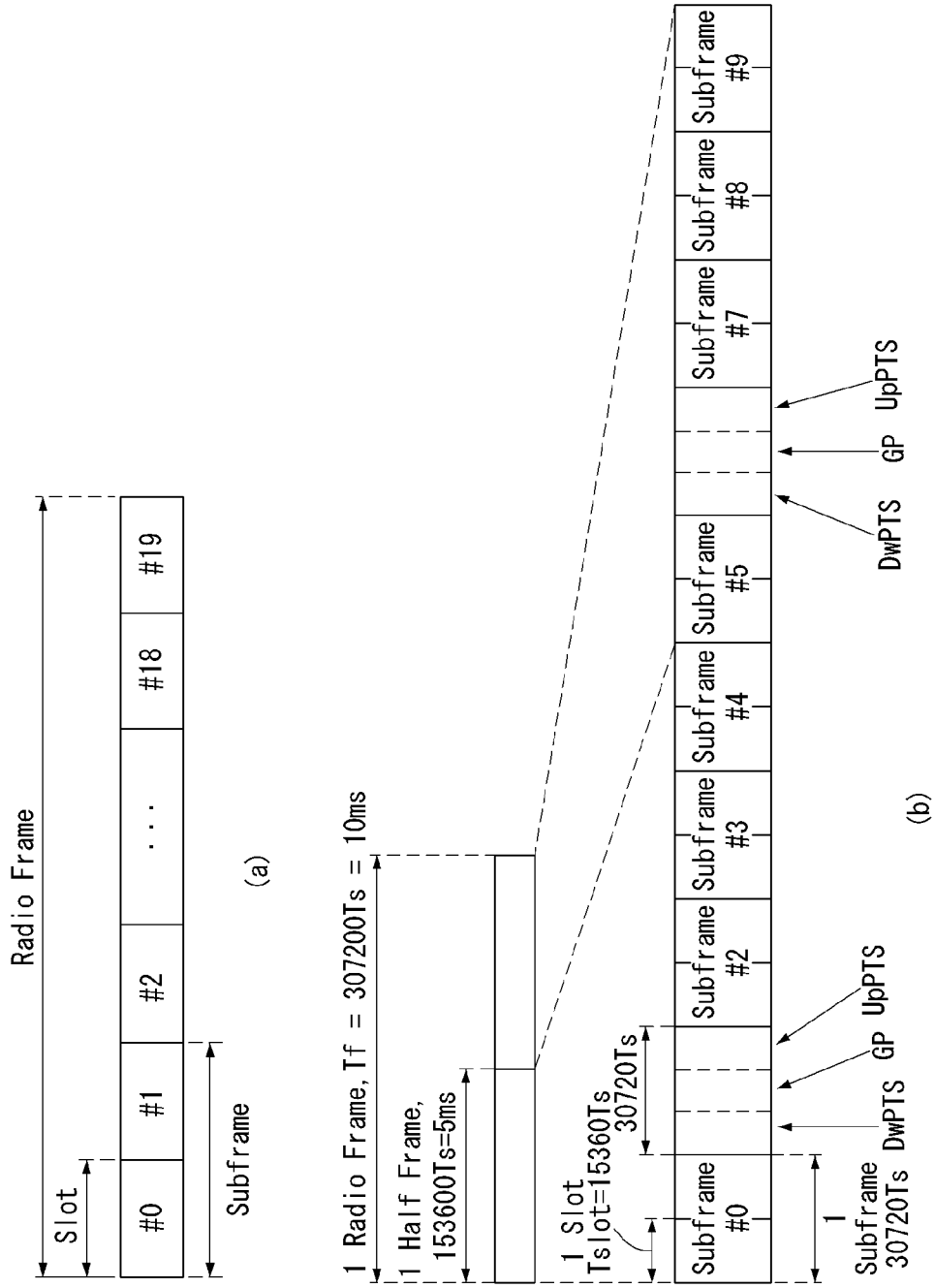

[FIG. 2]
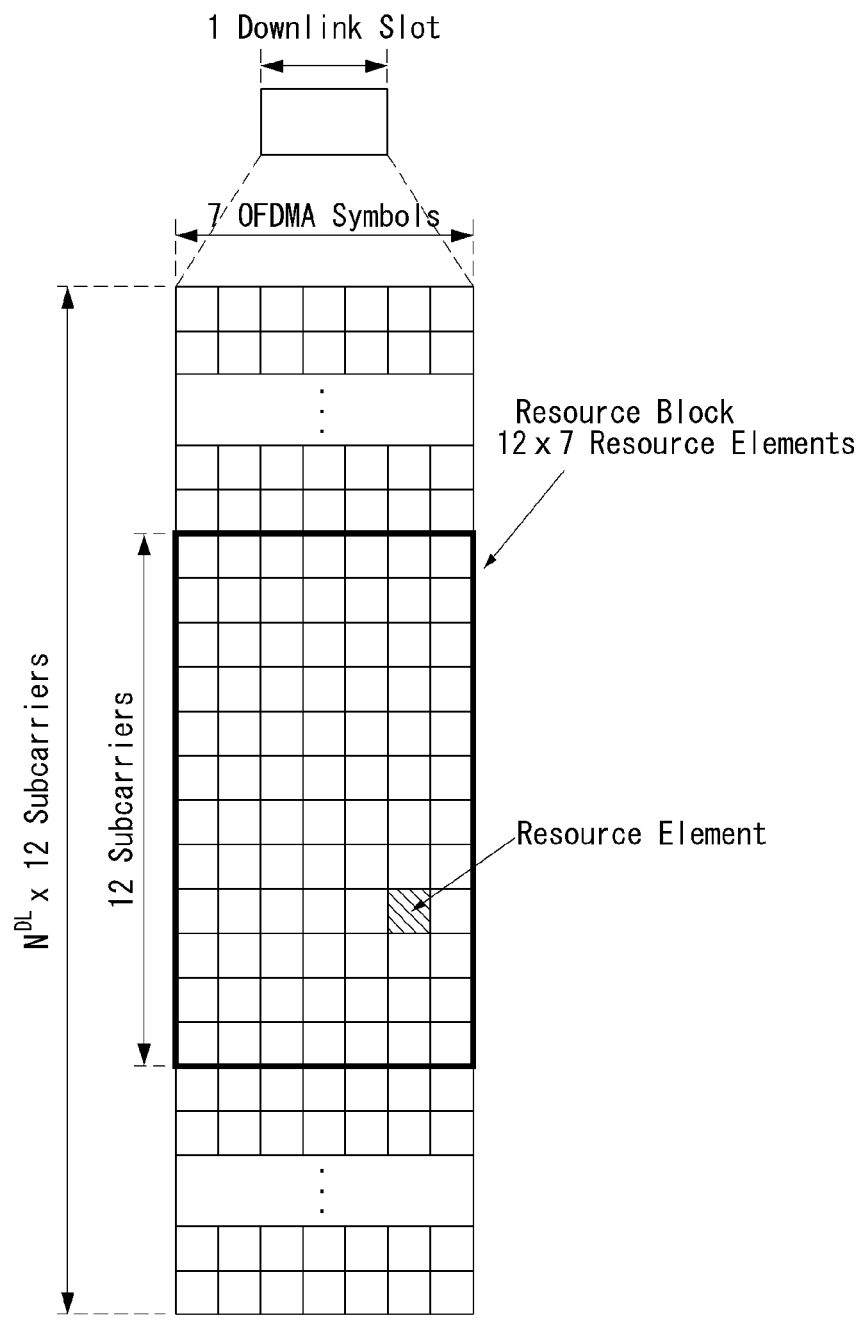

[FIG. 3]
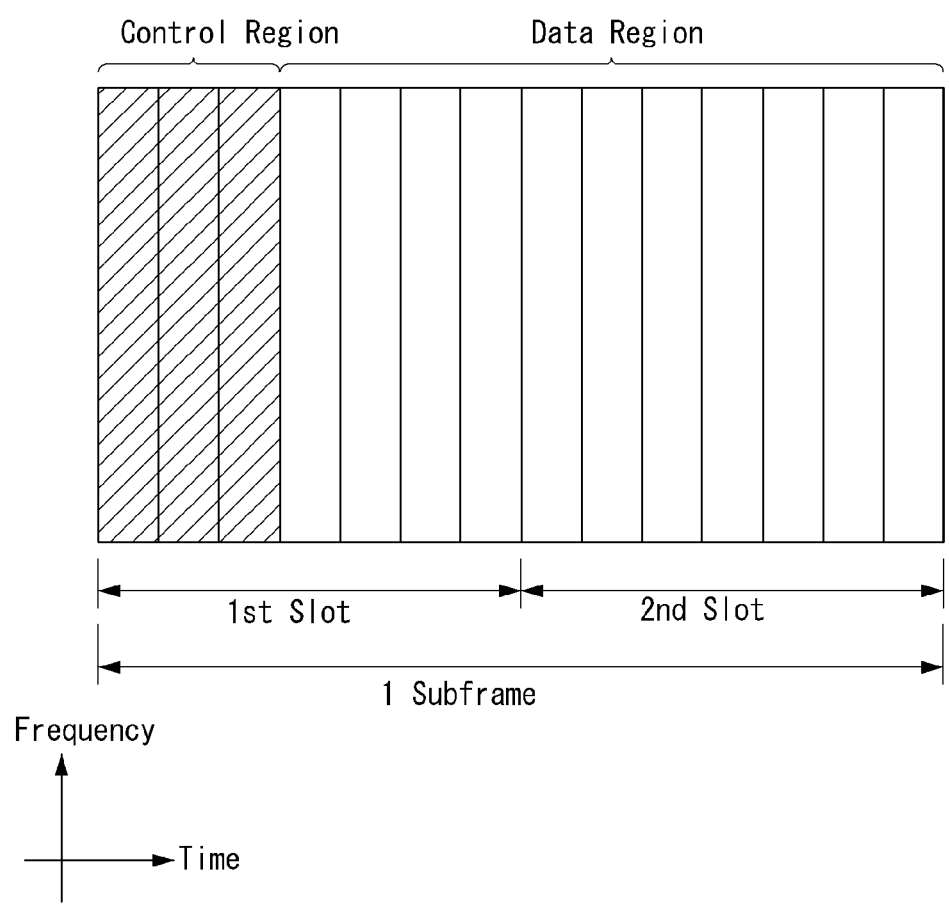

[FIG. 4]
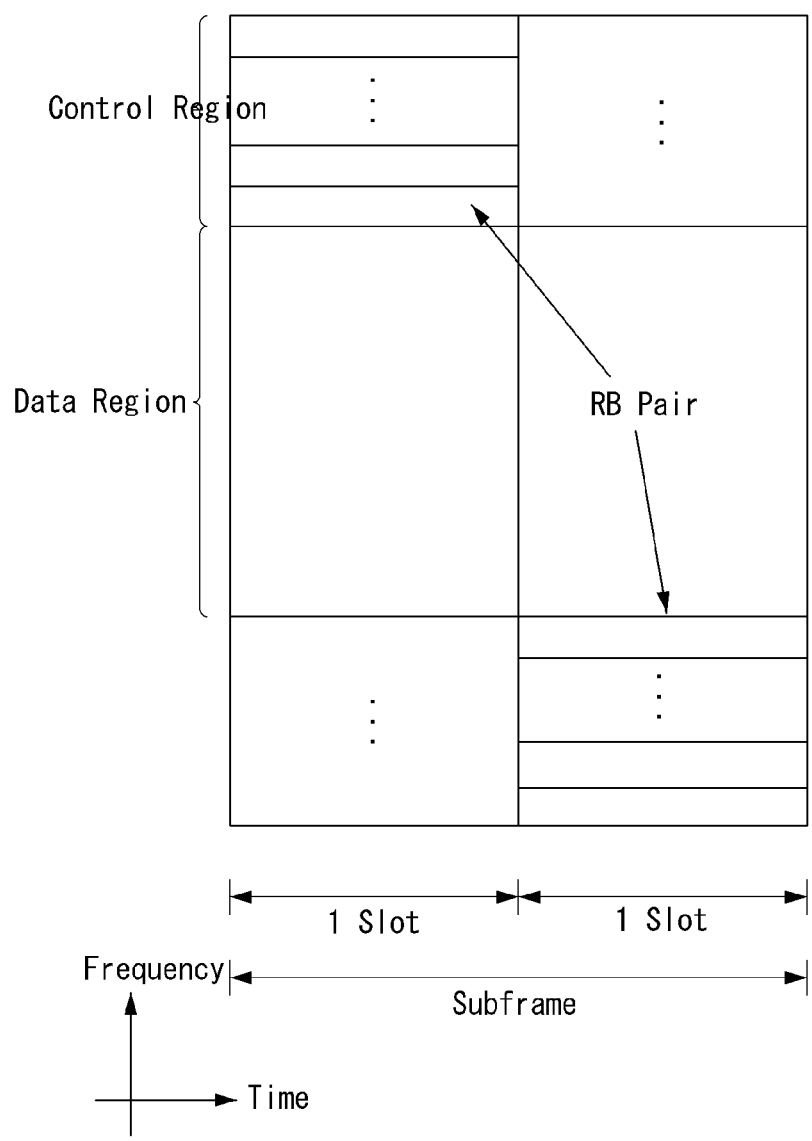

【FIG. 5】
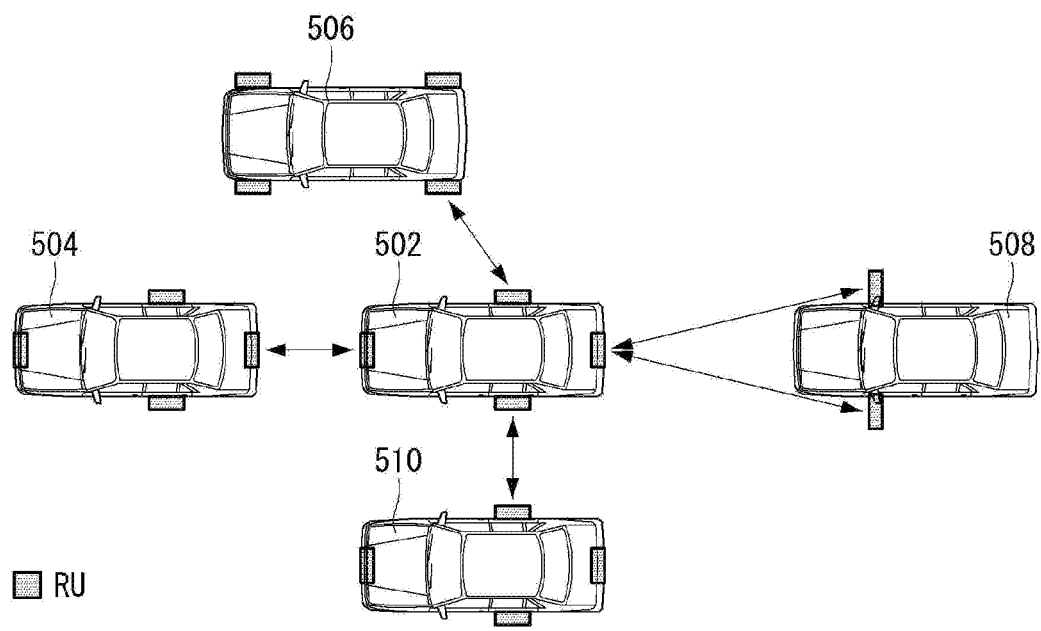
RU
【FIG. 6】
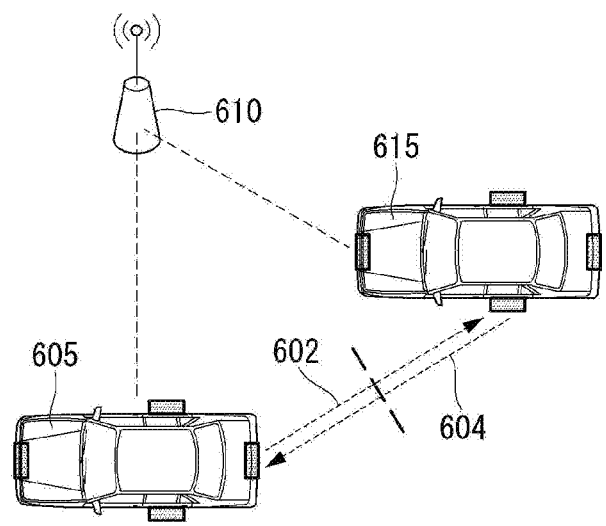

[FIG. 7]
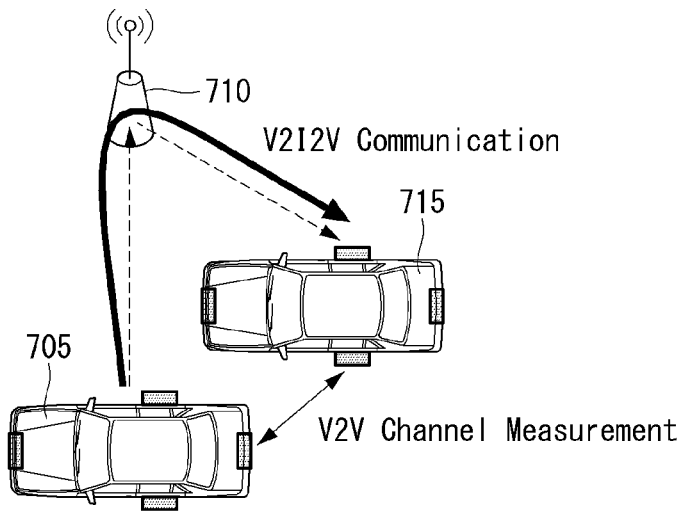
[FIG. 8]
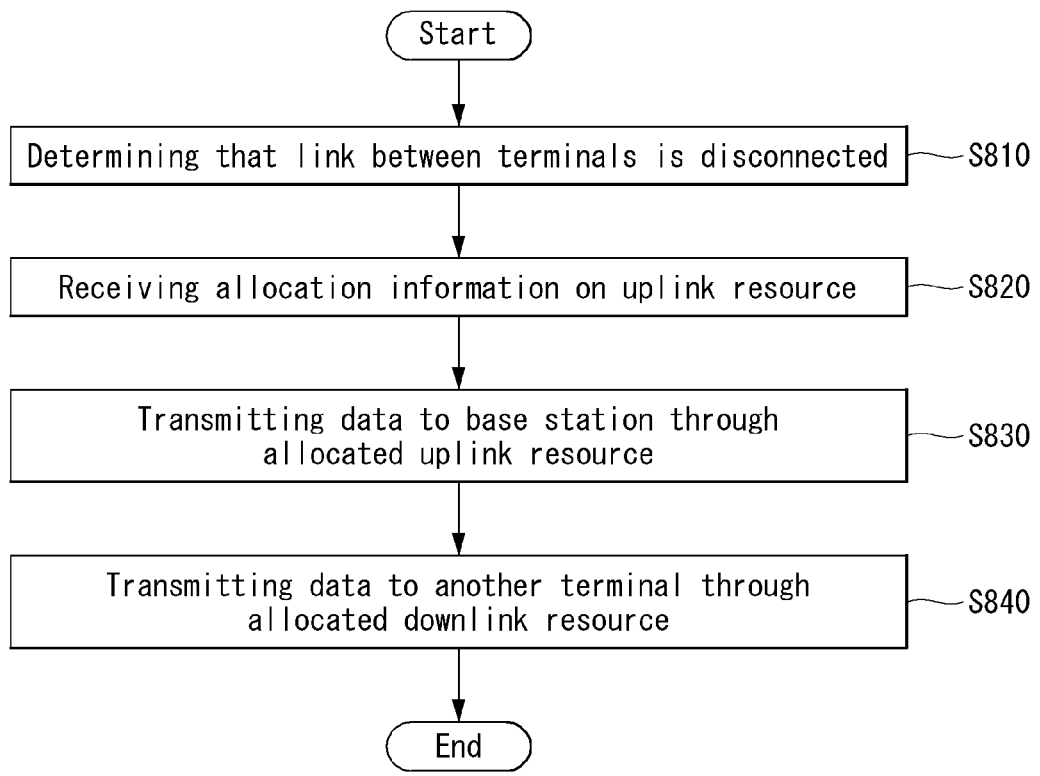

[FIG. 9]
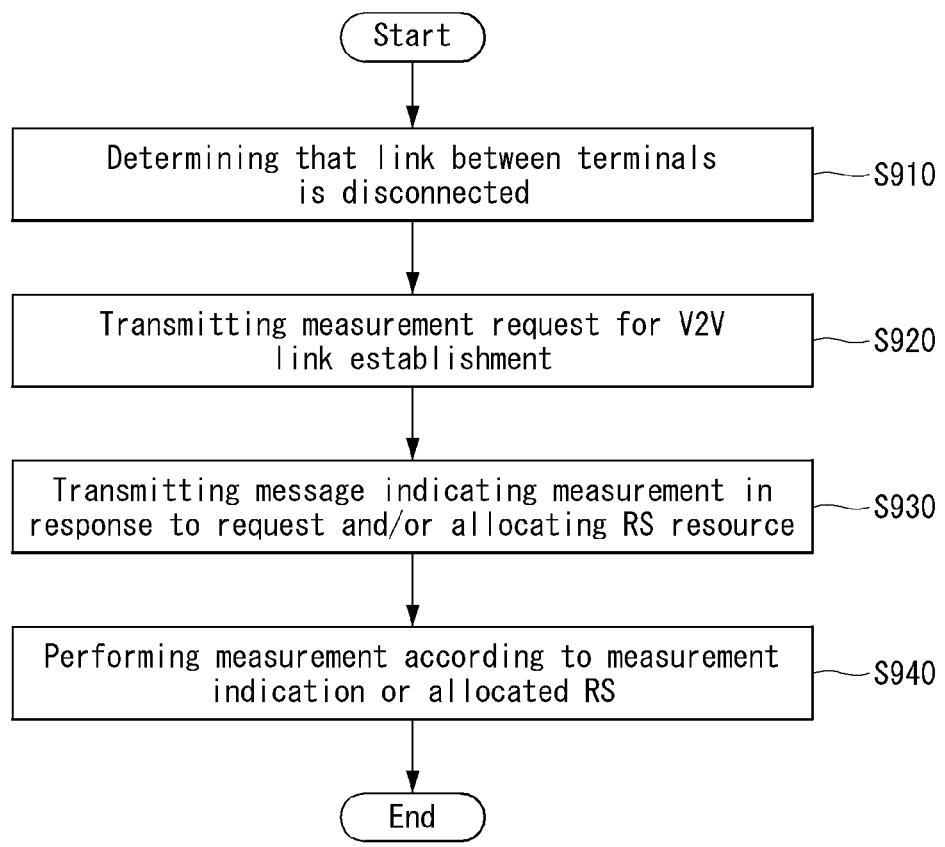

[FIG. 10]
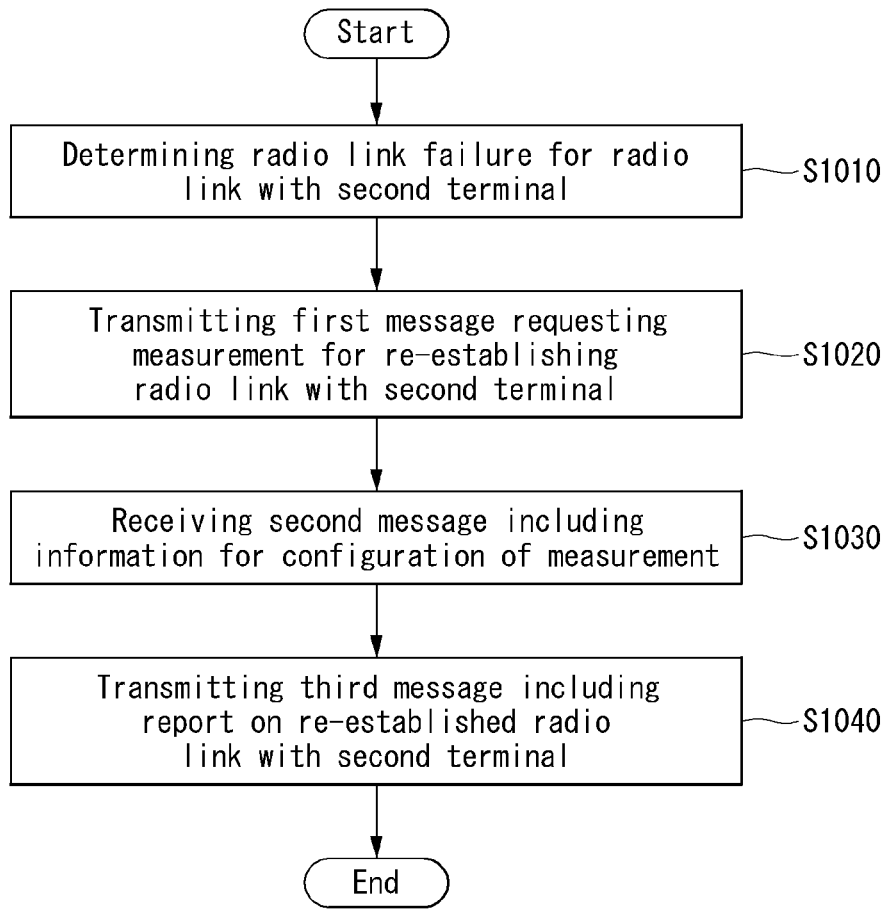
[FIG. 11]
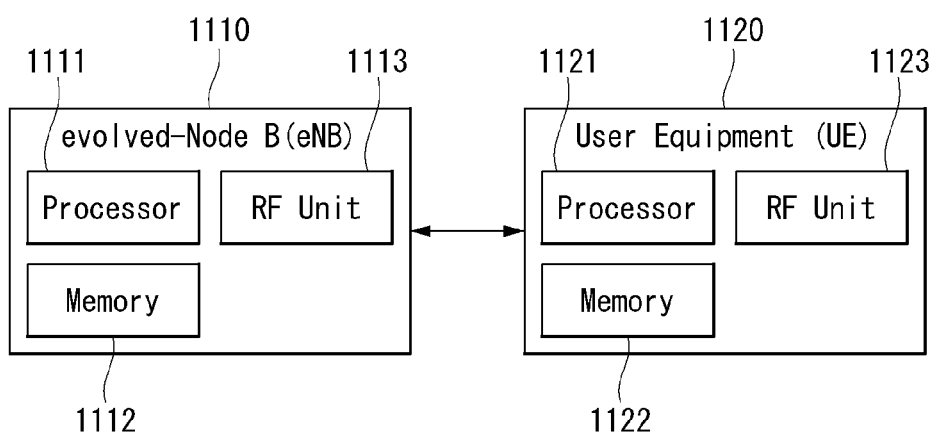

METHOD FOR RECOVERING LINK BETWEEN TERMINALS IN WIRELESS COMMUNICATION SYSTEM, AND DEVICE THEREFOR

This application is a National Stage Entry of International Application No. PCT/KR2017/000715 filed Jan. 20, 2017, which is incorporated herein by reference.

TECHNICAL FIELD

The present invention relates to a wireless communication system, and more particularly, to a method for recovering a disconnected communication link between terminals and an apparatus supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

Due to external or internal factors, there is a problem that a link between terminals (e.g., vehicle to vehicle (V2V) link) is disconnected.

The present invention proposes a method for recovering (or re-establishing) a link between terminals in a wireless communication system in order to solve the above-described problems.

In addition, the present invention proposes a method for transmitting data to another terminal using a vehicle to infrastructure to vehicle (V2I2V) link.

In addition, the present invention proposes a method for recovering a link between terminals by performing an aperiodic channel and/or beam measurement.

Technical objects to be achieved by the present invention are not limited to the aforementioned technical objects, and other technical objects not described above may be evidently understood by a person having ordinary skill in the art to which the present invention pertains from the following description.

Technical Solution

A method for re-establishing a link between terminals in a wireless communication system of the present invention, the method performed by a first terminal includes determining a radio link failure for a radio link with a second terminal, transmitting a first message requesting a measurement for re-establishing the radio link with the second terminal to a base station based on the determined radio link failure, receiving a second message including information for a configuration of the measurement from the base station corresponding to the transmitted first message, and transmitting a third message including a report on a re-established radio link with the second terminal to the base station by performing the measurement based on the information for the configuration.

In addition, in the present invention, the determining the radio link failure for the radio link with the second terminal may include determining the radio link failure based on at least one of a case in which a received power for a reference signal received from the second terminal is less than or equal to a predetermined threshold or a case in which an ACK/NACK response is not received within a predetermined period from the second terminal.

In addition, in the present invention, the determining the radio link failure for the radio link with the second terminal may include determining the radio link failure based on whether decoding for at least one of control information or data information received from the second terminal is unsuccessful.

In addition, in the present invention, the radio link with the second terminal may be established based on at least one of a unicast service or a multicast service between the first terminal and the second terminal.

In addition, in the present invention, the measurement may include a measurement using at least one of a channel or a beam between the first terminal and the second terminal.

In addition, in the present invention, the measurement using at least one of the channel or the beam between the first terminal and the second terminal may include a measurement aperiodically triggered by the base station.

In addition, in the present invention, the information for the configuration of the measurement may include resource allocation information of a reference signal for the measurement using at least one of the channel or the beam between the first terminal and the second terminal.

In addition, in the present invention, the second message may be transmitted using at least one of higher layer signaling or downlink control information.

In addition, in the present invention, the radio link with the second terminal may include a vehicle to vehicle link between the first terminal and the second terminal.

A first terminal for re-establishing a link between terminals in a wireless communication system of the present invention includes a transmitting and receiving unit for transmitting and receiving a radio signal, and a processor functionally connected to the transmitting and receiving unit, wherein the processor is configured to control to determine a radio link failure for a radio link with a second terminal, transmit a first message requesting a measurement for re-establishing the radio link with the second terminal to a base station based on the determined radio link failure, receive a second message including information for a configuration of the measurement from the base station corresponding to the transmitted first message, and transmit a third message including a report on a re-established radio link with the second terminal to the base station by performing the measurement based on the information for the configuration.

Advantageous Effects

According to an embodiment of the present invention, when the radio link between the terminals is disconnected, the radio link between the terminals can be quickly recovered using the radio link between the terminal and the base station.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings included as part of the detailed description in order to help understanding of the present invention provide embodiments of the present invention, and describe the technical characteristics of the present invention along with the detailed description.

FIG. 1 illustrates the structure of a radio frame in a wireless communication system to which the present invention may be applied.

FIG. 2 is a diagram illustrating a resource grid for one downlink slot in a wireless communication system to which the present invention may be applied.

FIG. 3 illustrates the structure of a downlink subframe in a wireless communication system to which the present invention may be applied.

FIG. 4 illustrates the structure of an uplink subframe in a wireless communication system to which the present invention may be applied.

FIG. 5 illustrates an example of a V2V link configuration between vehicles according to an embodiment of the present invention.

FIG. 6 illustrates a disconnection of a link between terminals according to an embodiment of the present invention.

FIG. 7 illustrates methods for being performed by a terminal when a link between terminals is disconnected according to an embodiment of the present invention.

FIG. 8 illustrates a procedure for transmitting data to a terminal through a V2I2V link transmission according to an embodiment of the present invention.

FIG. 9 illustrates a procedure for recovering a V2V link through a channel and/or beam measurement according to another embodiment of the present invention.

FIG. 10 illustrates an operation flowchart of a terminal re-establishing a link between terminals according to an embodiment of the present invention.

FIG. 11 illustrates a block diagram of a wireless communication apparatus according to an embodiment of the present invention.

MODE FOR INVENTION

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), a generation NodeB (gNB), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service(GPRS)/enhanced data rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A/New RAT (NR) is primarily described for clear description, but technical features of the present invention are not limited thereto.

General LTE System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

In FIG. 1, the size of the radio frame in the time domain is represented by a multiple of a time unit of $T\_s=1/(15000*2048)$. The downlink and uplink transmissions are composed of radio frames having intervals of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_slot=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTn). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous sub-carriers in one slot.

FIG. 1(b) shows the type 2 radio frame structure.

The type 2 radio frame structure includes 2 half frames each having a length of $153600*T\_s=5$ ms. Each of the half frames includes 5 subframes each having a length of $30720*T\_s=1$ ms.

In the type 2 radio frame structure of a TDD system, an uplink-downlink configuration is a rule showing how uplink and downlink are allocated (or reserved) with respect to all of subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "$T\_slot=15360*T\_s=0.5$ ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 shows a configuration (i.e., the length of a DwPTS/GP/UpPTS) of the special subframe.

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Enhanced PDCCH (EPDCCH) carries UE-specific signaling. The EPDCCH is located in a physical resource block (PRB) that is set to be terminal specific. In other words, as described above, the PDCCH can be transmitted in up to three OFDM symbols in the first slot in the subframe, but the EPDCCH can be transmitted in a resource region other than the PDCCH. The time (i.e., symbol) at which the EPDCCH in the subframe starts may be set in the UE through higher layer signaling (e.g., RRC signaling, etc.).

The EPDCCH is a transport format, a resource allocation and HARQ information associated with the DL-SCH and a transport format, a resource allocation and HARQ information associated with the UL-SCH, and resource allocation information associated with SL-SCH (Sidelink Shared Channel) and PSCCH Information, and so on. Multiple EPDCCHs may be supported and the terminal may monitor the set of EPCCHs.

The EPDCCH can be transmitted using one or more successive advanced CCEs (ECCEs), and the number of ECCEs per EPDCCH can be determined for each EPDCCH format.

Each ECCE may be composed of a plurality of enhanced resource element groups (EREGs). EREG is used to define the mapping of ECCE to RE. There are 16 EREGs per PRB pair. All REs are numbered from 0 to 15 in the order in which the frequency increases, except for the RE that carries the DMRS in each PRB pair.

The UE can monitor a plurality of EPDCCHs. For example, one or two EPDCCH sets may be set in one PRB pair in which the terminal monitors the EPDCCH transmission.

Different coding rates can be realized for the EPCCH by merging different numbers of ECCEs. The EPCCH may use localized transmission or distributed transmission, which may result in different mapping of the ECCE to the REs in the PRB.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to the PUCCH for one terminal. RBs included in the RB pair occupy different subcarriers in two slots, respectively. The RB pair allocated to the PUCCH frequency-hops in a slot boundary.

With development of LTE (-A) or New Radio Access Technology (New RAT), services using communication between vehicles are being developed.

For example, a vehicle to which communication between vehicles is applied may provide services such as platooning, convoy, and cooperative maneuver assistance.

For example, a vehicle must collect information of surrounding vehicles in order to perform the platooning. Here, the information of the surrounding vehicles may include information on speed and location of the front, rear, and/or side vehicles with respect to the vehicle. As the vehicle collects the information of the surrounding vehicles, the vehicle can use the collected information to control the speed and direction of the vehicle for the platooning.

As described above, in order for the vehicle to collect the necessary information to provide the service, the vehicle needs to be communicatively connected to the surrounding vehicles.

In other words, in order to provide the service, the vehicle needs to form a plurality of vehicle-to-vehicle (V2V) links (or connections) with the surrounding vehicles.

Here, the V2V link may mean a connection between the vehicle or communication devices installed on the vehicle, a communication connection, a communication link, a radio link, and a sidelink connection between the terminals (or vehicles) and the like.

V2V communication technology of legacy LTE has been developed in order for the vehicle to broadcast its own information to the surroundings. In other words, in the V2V communication technology of legacy LTE, the V2V link configuration in which the vehicle unicasts its own information has not been considered.

Here, in the case of the broadcast system, the vehicle must transmit the signal in all directions, so that the vehicle's radio device needs to support omni-antenna characteristics.

However, when the vehicle transmits the signals in a unicast manner, a direct V2V link between the vehicles is formed. Thus, in this case, the vehicle may be equipped with a plurality of wireless devices having characteristics of a directional antenna to establish the direct V2V links between the vehicles.

When the vehicle is equipped with the plurality of wireless devices, the vehicle can support the plurality of multiple V2V links more efficiently in terms of communication delay and/or capacity.

In the following description, the terminal can be used as a vehicle, a communication device installed in the vehicle, a mobile communication device, or a term collectively referring to a communication device installed in a specific area.

FIG. 5 illustrates an example of a V2V link configuration between vehicles according to an embodiment of the present invention. FIG. 5 is merely for convenience of explanation and does not limit the scope of the present invention.

Referring to FIG. 5, terminals 502, 504, 506, 508, and 510 each may include a plurality of wireless devices. Locations where the wireless devices shown in FIG. 5 are installed are for convenience of description, and the wireless devices may be installed in various parts (e.g., front/rear bumper, side mirror, wheel, door, etc.) of the terminal.

In the case of FIG. 5, a wireless device installed on a front side of the terminal 502 may be connected to a wireless device installed on a rear side of the terminal 504. Accordingly, a V2V link between the terminal 502 and the terminal 504 may be established (or formed).

In addition, a wireless device installed on a rear side of the terminal 502 may be connected to wireless devices installed on side mirrors of the terminal 508. Accordingly, a V2V link between the terminal 502 and the terminal 508 may be established.

In addition, the terminal 502 may establish a V2V link with the terminal 510 or the terminal 506 using a wireless device installed on a left or right side of the terminal 502, respectively.

A Method of Determining Whether a V2V Link Between Terminals is Disconnected

As described above, the terminal may establish V2V links with a plurality of surrounding terminals to perform functions such as platooning, convoy, cooperative maneuver assistance, or automatic driving.

However, after the V2V link between the terminals is established, a disconnection of the V2V link may occur as an antenna module or a panel is damaged due to beam blocking (for example, when a beam is blocked by a building or another obstacle), an accident, or the like.

Here, the disconnection of the V2V link may mean a state that the terminal can not transmit or receive data directly to another terminal.

When a unicast communication between the terminals situation is considered, a transmission terminal and a reception terminal may determine that the current V2V link is disconnected and as a result, the link has failed through a method described below.

FIG. 6 illustrates a disconnection of a link between terminals according to an embodiment of the present invention. FIG. 6 is merely for convenience of explanation and does not limit the scope of the present invention.

Referring to FIG. 6, a terminal 605 may refer to a transmission terminal and a terminal 615 may refer to a reception terminal. It is also assumed that the terminal 605 and the terminal 615 are communicatively connected to a base station 610 and a V2V link between the terminal 605 and the terminal 615 is disconnected.

Here, the transmission terminal may mean a terminal which wants to transmit data to another terminal, and the reception terminal may mean a terminal which wants to receive data from another terminal.

In one embodiment, when a received power for a reference signal for a transmission channel measurement transmitted from the terminal 615 is less than or equal to a specific threshold, the terminal 605 may determine that links 602 and/or 604 between terminals are disconnected (or the link has failed).

Here, the link 602 means a link for a channel between the terminal 605 and the terminal 615, and the link 604 means a link for a channel between the terminal 615 and the terminal 605.

Here, the reference signal for the transmission channel measurement may be a sounding reference signal (SRS).

In addition, the threshold used for determining the disconnection of the link between terminals may be changed according to implementation of a chipset between the base station and the terminal and/or the terminals.

In addition, as described above, since only the broadcast communication is considered in a vehicle to everything (V2X) system supported by the legacy LTE, there is no reference signal for a channel measurement between the terminals.

Accordingly, when unicast or multicast communication between terminals is considered, a reference signal for a channel measurement for communication between terminals (e.g., side link) needs to be newly defined.

At this time, when channel reciprocity is established between the link 602 and the link 604, each of the terminal 605 and the terminal 615 can measure a channel using only one (single or one-directional) channel measurement reference signal regardless of the direction of communication between terminals. This is because bi-directional channel (a channel of the link 602 and a channel of the link 604) characteristics are very similar when the channel reciprocity is applied.

On the other hand, when the channel reciprocity is not established between the link 602 and the link 604, the characteristics of the channel of the link 602 and the channel of the link 604 are different. Thus, in this case, the terminal can measure the channel using a different channel measurement reference signal for the link 602 and the link 604, respectively.

In another embodiment, when the terminal 605 fails to receive an ACK/NACK response for data reception from the terminal 615 for a specific time period, the terminal 605 may determine that the link between terminals is disconnected (or failed).

For example, when the terminal 605 fails to receive a reception response (ACK or NACK) within one second after transmitting data to the terminal 615, the terminal 605 may determine that the link 602 and/or the link 604 are disconnected.

In this case, when unicast communication is performed between the terminal 605 and the terminal 615, it is assumed that an ACK/NACK response procedure, that is, Automatic Repeat reQuest (ARQ) and/or Hybrid Automatic Repeat reQuest (HARQ) procedure, used in the legacy LTE is also performed in the communication between the terminals.

In another embodiment, when a reference signal received power (RSRP) value for the reference signal transmitted from the terminal 605 is less than or equal to a specific threshold, the terminal 615 may determine that the link between the terminals is disconnected.

Here, the specific threshold may be preset based on a network environment, a link preference of a user, and the like.

In another embodiment, when the terminal 615 can not decode control information and/or data information due to a low received power level of the signal transmitted from the terminal 605, in other words, when the decoding fails, the terminal 615 may determine that the link between the terminals is disconnected.

More specifically, the terminal 615 may determine the disconnection of the link based on whether decoding for a control channel and/or a data channel for a sidelink is successful or not.

When the terminal detects (identifies or confirms) that the V2V link with another terminal is disconnected according to the above-described methods, the V2V link needs to be recovered (restored or re-established) in order to transmit and receive data between the terminals.

In this case, two methods for transmitting data to another terminal may be considered. One is a method in which a terminal transmits data to another terminal through a communicatively connected base station, and the other is a method of restoring a V2V link through an aperiodic channel measurement between terminals triggered by intervention of the base station.

FIG. 7 illustrates methods for being performed by a terminal when a link between terminals is disconnected according to an embodiment of the present invention. FIG. 7 is merely for convenience of explanation and does not limit the scope of the present invention.

Referring to FIG. 7, it is assumed that a terminal 705 and a terminal 715 are communicatively connected to a base station 710. In other words, in the other embodiment of the present invention, the terminal 705 and the terminal 715 may not be connected to the base station 710.

It is also assumed that the terminal 705 means a transmission terminal and the terminal 715 means a reception terminal. In other words, in the other embodiment of the present invention, the terminal 705 may be the reception terminal, and the terminal 715 may be the transmission terminal.

When a V2V link (V2V connection or V2V communication) between the terminal 705 and the terminal 715 is disconnected, the terminal 705 can transmit data to the terminal 715 through a vehicle to infrastructure to vehicle (V2I2V) link (or V2I2V communication) using the base station 710.

Here, a wireless device used for transmitting data to the base station 710 may be different from a wireless device used for communication with the terminal 715.

In this case, the terminal 705 may request a recovery of a link (or a V2V link) between terminals while transmitting the data to the base station 710 (or attempting to transmit data through the V2I2V link via the base station 710). The request may be performed through a request message transmitted from the terminal 705 to the base station 710.

Unlike this, when the terminal 705 does not perform a separate request, the V2V link between the terminal 705 and the terminal 715 may be recovered by a channel measurement between the terminal 705 and the terminal 715 in a predetermined period (or periodically).

In addition, when the terminal 705 transmits the data to the terminal 715 through the V2I2V link, the terminal 705 may consider resources that can transmit and receive with the terminal 715 and resources that can transmit and receive with the base station 710.

In addition, the terminal 705 may consider the resources that can transmit and receive with the terminal 715 and the resources that the terminal 715 can transmit and receive with the base station 710.

Here, the resources that can be transmitted and received between the terminals may mean resources defined for the links (e.g., sidelink) between the terminals. In this case, the side link is a concept including sidelink discovery, sidelink communication, and V2X side link communication.

In addition, uplink transmission means that a terminal transmits a signal to a base station, and downlink reception means that the terminal receives a signal from the base station.

More specifically, the terminal 705 may request, to the base station 710, scheduling information related to resources of uplink transmission or resources of downlink reception allocated to the terminal 715. Thereafter, the terminal 705 may confirm resource allocation information of a downlink signal transmitted from the base station 710 to the terminal 715 through information received from the base station 710. Accordingly, the terminal 705 may transmit the data to be transmitted to the terminal 715 through resources not used for the transmission of the downlink signal and the V2I2V link to the base station 710.

In this case, the terminal 705 may use information on Cell Radio Network Temporary Identifier (C-RNTI) of the terminal 715. For example, the terminal 705 receives a Physical Downlink Control Channel (PDCCH) transmitted (or broadcast) from the base station 710 and identifies the C-RNTI of the terminal 715, so that the terminal 705 may confirm downlink or uplink resource information for the terminal 715.

Using the above-described methods, the terminal 705 may transmit the data to the terminal 715 through the V2I2V link while avoiding a time when the terminal 715 receives the another downlink signal.

As a result, the terminal 705 can prevent a case in which the data transmitted to the terminal 715 through the V2I2V link is dropped by the another downlink signal.

A method of transmitting data using the V2I2V link when a link (or connection) between terminals is disconnected will be described in detail in a section of FIG. 8 which will be described later.

In addition, the terminal 705 can recover a disconnected V2V link by measuring a channel for the V2V link with the terminal 715 or performing a beam search procedure.

Here, the channel measurement and/or the beam search procedure may mean to be performed aperiodically as well as periodically.

A method of restoring the V2V link through the aperiodic channel measurement and/or the beam search procedure will be described in detail in a section of FIG. 9 which will be described later.

A Method for Transmitting Data to a Disconnected Terminal Through a V2I2V Link

FIG. 8 illustrates a procedure for transmitting data to a terminal through a V2I2V link transmission according to an embodiment of the present invention. FIG. 8 is merely for convenience of explanation and does not limit the scope of the present invention.

Referring to FIG. 8, it is assumed that a transmission terminal (e.g., the terminal 705), a reception terminal (e.g., the terminal 715), and a base station (e.g., the base station 710) exist as shown in FIG. 7. Here, the transmission terminal means a terminal transmitting data to the reception terminal, and the reception terminal means a terminal receiving data from the transmission terminal.

In step S810, the transmission terminal and/or the reception terminal may confirm (or identify) that a link between the terminals is disconnected. Here, each of the transmission terminal and/or the reception terminal may identify the disconnection of the link through the method described in the section on FIG. 6.

For example, the reception terminal may determine a connection state of a V2V link between the terminals based on measured reception signal quality, and the transmission terminal may determine the connection state of the V2V link between the terminals based on whether ACK/NACK responses for a transmitted signal are received.

When the transmission terminal and/or the reception terminal determine that the links between the terminals are disconnected, the terminals each may determine whether it is connected to the base station.

When each terminal is not connected to the base station, the each terminal can request a connection to the base station. For example, the transmission terminal and/or the reception terminal may transmit a message requesting random access, or a message (e.g., an RRC connection request) requesting a radio resource control (RRC) connection to the base station.

When the transmission terminal and/or the reception terminal determines that the link between the terminals is disconnected and is connected to the base station, in step S820, the transmission terminal may receive allocation information on an uplink resource from the base station. Here, the uplink resource means a resource used for transmitting, to the base station, data to be transmitted to the reception terminal.

In this case, the transmission terminal may transmit at least one scheduling request (SR) to the base station in order to receive the allocation information on the uplink resource. Here, the at least one SR may include one default SR and an extra SR for sidelink (bypass) transmission.

For example, when the transmission terminal transmits one SR, the transmission terminal may receive a response to the SR after transmitting the SR to the base station. Thereafter, the transmission terminal may transmit a buffer status report (BSR) to the base station in response to the response, and receive information (e.g., UL grant) on resources to transmit data in response to the BSR from the base station.

In this case, the transmission terminal may transmit information on the reception terminal to the base station to indicate (or represent) a terminal (or a reception terminal) to receive the transmitted data. The information on the reception terminal is a BSR including a field of identifier (ID) information (for example, C-RNTI, etc.) on the reception terminal.

Here, the ID information on the reception terminal may mean a destination of data to be transmitted by the transmission terminal through the base station. In addition, the ID information on the reception terminal may be included in a message of a physical layer (or a message of a PHY terminal) transmitted from the transmission terminal to the base station.

For another example, the transmission terminal may transmit a plurality of SRs to the base station for uplink transmission. In this case, the transmission terminal may perform the above-described procedures (SR transmission, SR response reception, BSR transmission, and BSR response reception) in a case of transmitting a first SR.

However, when the transmission terminal transmits another SR (e.g., an urgent message or a message used in ultra-reliable low latency communication) to the base station after the transmission of the first SR, some of the procedures described in the above example may be omitted.

In other words, when the transmission terminal transmits the another SR, the transmission terminal may transmit the BSR and omit a procedure of receiving a response (e.g., UL grant) to the BSR.

Therefore, the transmission terminal may receive the allocation information (e.g., UL grant) on the uplink resource from the base station after transmitting the SR. In this case, since the transmission terminal does not transmit the BSR, the transmission terminal can not transmit the ID information of the reception terminal to the base station through the BSR.

When the transmission terminal receives the allocation information on the uplink resource, in step S830, the transmission terminal may transmit data (or data to be transmitted to the reception terminal) to the base station through an allocated uplink resource.

Here, the data transmitted to the base station may include the ID information of the reception terminal.

More specifically, when the allocation information on the uplink resource is received using a single SR, the ID information of the reception terminal may not be included in the data.

Alternatively, when the allocation information on the uplink resource is received using a plurality of SRs, since the transmission terminal omits the BSR transmission, it may transmit data including the ID information of the reception terminal to the base station.

When the base station receives data from the transmission terminal, in step S840, the base station may transmit data to another terminal (or the reception terminal) through an allocated downlink resource.

In this case, before transmitting data to the reception terminal, the base station may transmit allocation information (e.g., DL grant) on a downlink resource to the reception terminal. Accordingly, the reception terminal may identify the resource to which the data is transmitted using the allocation information, and as a result, may receive the transmitted data.

According to the above-described procedure, when the V2V link between terminals is disconnected, the transmission terminal may transmit data to the reception terminal through the V2I2V link. In this case, the reception terminal may transmit an ACK/NACK response for data reception to the transmission terminal through the V2I2V link.

In general, a channel (or beam) measurement period between the terminal and the base station may be shorter than a link discovery measurement period between the terminals. Accordingly, a case of transmitting data through the V2I2V link after a connection attempt between the terminal and the base station may be more efficient than a case of recovering a direct V2V link by the terminals in terms of time.

A Method of Recovering a V2V Link Through Measurement Between Terminals

FIG. 9 illustrates a procedure for recovering a V2V link through a channel and/or beam measurement according to another embodiment of the present invention. FIG. 9 is merely for convenience of explanation and does not limit the scope of the present invention.

Referring to FIG. 9, it is assumed that a transmission terminal (e.g., the terminal 705), a reception terminal (e.g., the terminal 715), and a base station (e.g., the base station 710) exist as shown in FIG. 7. Here, the transmission terminal means a terminal transmitting data to the reception terminal, and the reception terminal means a terminal receiving data from the transmission terminal.

In step S910, the transmission terminal and the reception terminal may confirm (or identify) that a link between the terminals is disconnected. Here, each of the transmission terminal and the reception terminal may identify the disconnection of the link through the method described in the section on FIG. 6.

For example, the reception terminal may determine a connection state of a V2V link between the terminals based on measured quality of reception signal, and the transmission terminal may determine the connection state of the V2V link between the terminals based on whether ACK/NACK responses for a transmitted signal are received.

When the transmission terminal and/or the reception terminal determine that the links between the terminals are disconnected, each of the terminals may determine whether it is connected to the base station.

) When the each of the terminals is not connected to the base station, the each of the terminals may request a connection to the base station. For example, the transmission terminal and/or the reception terminal may transmit a message requesting random access, or a message (e.g., an RRC connection request) requesting a radio resource control (RRC) connection to the base station.

When the transmission terminal and/or the reception terminal determines that the link between the terminals is disconnected and is connected to the base station, in step S920, the transmission terminal may transmit a measurement triggering request for the V2V link establishment (formation or restoration) to the base station.

Here, the measurement triggering request may be a request triggering a measurement on a channel and/or beam related with the V2V link. In this case, the request may be a message requesting an aperiodic measurement (e.g., event triggered beam measurement, event triggered channel measurement) in addition to an existing established periodic measurement.

After the base station receives the request from the transmission terminal, in step S930, the base station may transmit a message indicating a measurement to the transmission terminal and/or the reception terminal in response to the request.

Here, the measurement may mean an event triggered beam and/or channel measurement (aperiodic measurement) separate from a periodic beam measurement.

As the terminal receives the message and performs the measurement, the terminals (the transmission terminal and the reception terminal) can recover the link between the terminals and configure the beam and/or channel more quickly.

When the base station indicates the measurement as described above, the base station may transmit a message for the indication to the terminal through higher layer signaling (e.g., RRC) and/or downlink control information (DCI).

In addition, the base station may allocate resources for a reference signal for an aperiodic channel and/or beam measurement in response to the request, as well as a reference signal for a periodic channel and/or beam measurement.

Here, the channel and/or the beam means a channel and/or a beam used for the link between the terminals (for example, a V2V link).

In this case, the base station may transmit information on allocated resources to the transmission terminal and/or the reception terminal through higher layer signaling and/or downlink control information.

In various embodiments of the present invention, a procedure for transmitting the message indicating the measurement by the base station and a procedure for allocating resources for the reference signal for the aperiodic channel and/or beam measurement may be performed simultaneously, independently, or sequentially.

After that, in step S940, when the terminals receive the message indicating the measurement from the base station, the terminals may perform a triggered channel and/or beam measurement.

Accordingly, the terminals may identify a channel and/or beam suitable for recovering the V2V link between the terminals, as a result, the V2V link between the terminals may be recovered based on the identified channel and/or beam.

In addition, when the terminals receive resource allocation information for the reference signal for aperiodic channel and/or beam measurement, the terminals each may transmit a reference signal for a channel and/or beam measurement to another terminal through the allocated resources. For example, the transmission terminal may transmit a reference signal (e.g., SRS) for measuring a transmission channel to the reception terminal.

Accordingly, the terminals each may perform the channel and/or beam measurement using the reference signal and transmit a measurement report to the base station. Through the measurement, the V2V link between the terminals may be restored. For example, if a received power measurement value for the reference signal is determined to be greater than or equal to a specific threshold, the terminal may recover the V2V link using the corresponding channel and/or beam.

In general, a transmission period of a reference signal for beam search is very long, and transmission of the reference signal for channel and/or beam measurement may be performed aperiodically.

Therefore, when the base station does not allocate a separate resource for recovering the V2V link, since considerable time delay may occur in beam restoration, intervention of the base station may be required. That is, when the base station allocates resources for reference signal for the aperiodic channel and/or beam measurement as described above, the V2V link between the terminals may be restored (or recovered) more quickly.

In various embodiments of the present invention, an operation of transmitting data to a disconnected terminal through the V2I2V link and an operation of recovering the V2V link through the measurement between the terminals described above may be performed simultaneously, independently, or sequentially.

FIG. 10 illustrates an operation flowchart of a terminal re-establishing a link between terminals according to an embodiment of the present invention. FIG. 10 is merely for convenience of explanation and does not limit the scope of the present invention.

Referring to FIG. 10, it is assumed that a transmission terminal (e.g., the terminal 705). a reception terminal (e.g., the terminal 715), and a base station (e.g., the base station 710) exist as shown in FIG. 7. Here, the transmission terminal means a terminal transmitting data to the reception terminal, and the reception terminal means a terminal receiving data from the transmission terminal.

In step S1010, a first terminal may determine a radio link failure for a radio link with a second terminal. Here, when the first terminal is the transmission terminal, the second terminal is the reception terminal, and when the first terminal is the reception terminal, the second terminal is the transmission terminal.

Here, the first terminal may determine the radio link failure similarly to the determination procedure for the case in which the link between the terminals is disconnected described in the section of FIG. 6 described above. The radio link failure may mean a state that the first terminal can not transmit and receive control information and/or data information with the second terminal.

In addition, when the first terminal is the transmission terminal, the first terminal may determine that the radio link has failed in a case of a received power for a reference signal received from the second terminal is less than or equal to a predetermined threshold.

In addition, when the first terminal is the transmission terminal, the first terminal may determine that the radio link has failed in a case of an ACK/NACK response is not received within a predetermined period from the second terminal. Here, the predetermined period may be configured by a network service administrator or a network service user. In this case, it is assumed that communication services between the first terminal and the second terminal support ARQ and/or HARQ procedures.

In addition, when the first terminal is the reception terminal, the first terminal may determine that the radio link has failed in a case of a control information and/or data information received from the second terminal can not be decoded.

In addition, the radio link between the first terminal and the second terminal may be established based on a unicast service or a multicast service.

When the first terminal determines that the radio link has failed, in step S1020, the first terminal may transmit a first message requesting a measurement for re-establishing the radio link with the second terminal to the base station. In this case, it is assumed that the base station and the first terminal are communicatively connected (or a state in which signals can be transmitted and received).

The operation of the first terminal in step S1020 may be similar to the operation of the transmission terminal described in the section of FIG. 9.

Here, the measurement requested by the first terminal may be a measurement using at least one of a channel or a beam between the first terminal and the second terminal.

In addition, the measurements requested by the first terminal may include an aperiodic measurement in addition to a periodic measurement. For example, the first terminal may transmit a message including a V2V beam measurement triggering request to the base station.

After the first terminal transmits the first message to the base station, in step S1030, the first terminal may receive a second message including information for a configuration of the measurement corresponding to the transmitted first message.

In step 1030, the operation of the first terminal may be similar to the operation of the the transmission terminal described in the section of FIG. 9 described above.

Herein, the information for the configuration may include an indication for the measurement.

In addition, the information for the configuration may include resource allocation information of a reference signal for a measurement using a channel and/or a beam between the first terminal and the second terminal.

Resource for the reference signal may be allocated by the base station for an aperiodic measurement between terminals.

In addition, the second message including information for the configuration may be received by the first terminal through higher layer signaling or downlink control information.

After the first terminal receives the second message, in step S1040, the first terminal may transmit a third message including a report on a re-established radio link with the second terminal to the base station.

Here, the re-established radio link may be configured by the measurement based on the information for the configuration received in step S1030.

In other words, after the first terminal performs a channel and/or beam measurement with the second terminal using the information for the configuration (for example, resource allocation information of a reference signal for a measurement, etc.) received from the base station, the first terminal may report the measurement results to the base station.

General Apparatus to which the Present Invention May be Applied

FIG. 1I illustrates an example of the block diagram of a wireless communication apparatus to which the present invention may be applied.

Referring to FIG. 11, the wireless communication system includes a network node 1110 and multiple UEs 1120.

Network node 1110 includes a processor 1111, a memory 1112, and a communication module 1113. The processor 1111 implements the functions, processes and/or methods proposed in FIGS. 1 to 10. The layers of a wired/wireless interface protocol may be implemented by the processor 1111. The memory 1112 is connected to the processor 1111 and stores various types of information for driving the processor 1111. The communication module 1113 is connected to the processor 1111 and transmits and/or receives a wired/wireless signal.

In particular, when the network node 1110 is a base station, the communication module 1113 may include a radio frequency unit for transmitting/receiving a radio signal.

The UE 1120 includes a processor 1121, a memory 1122 and a communication module (or RF unit) 1123. The processor 1121 implements the functions, processes and/or methods proposed in FIGS. 1 to 10. The layers of a radio interface protocol may be implemented by the processor 1121. The memory 1122 is connected to the processor 1121 and stores various types of information for driving the processor 1121. The communication module (or RF unit) 1123 is connected to the processor 1121 and transmits and/or receives a radio signal.

The memory 1112, 1122 may be located inside or outside the processor 1111, 1121 and may be connected to the processor 1111, 1121 by various known means.

In addition, the network node 1110 (in the case of the base station) and/or the UE 1120 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method for recovering a communication link between terminals in a wireless communication system of the present invention has been illustrated as being applied to the 3GPP LTE/LTE-A system, but may be applied to various wireless communication systems in addition to the 3GPP LTE/LTE-A system.

The invention claimed is:

1. A method for re-establishing a link between terminals in a wireless communication system, the method performed by a first terminal, comprising:
   determining a status of the link between the first terminal and a second terminal;
   transmitting, to a base station, (i) a first message for requesting a measurement for re-establishing the link and (ii) information for identifying the second terminal, based on link recovery between the first terminal and the second terminal being required according to the determined status;

receiving, from the base station, (i) a second message for triggering the measurement and (ii) information related to a reference signal for the link recovery;

receiving, from the second terminal, the reference signal for the link recovery;

performing the measurement based on the reference signal for the link recovery; and re-establishing the link based on a value of the measurement being greater than or equal to a threshold;

wherein the method further comprises:

transmitting, to the base station, at least one scheduling request; and transmitting, to the base station, data to be transmitted to the second terminal, based on the link recovery between the first terminal and the second terminal being required, wherein a location in which the information for identifying the second terminal is included is determined based on a number of scheduling requests transmitted by the first terminal, and wherein based on a plurality of scheduling requests being transmitted, the information for identifying the second terminal is included in the data.

2. The method of claim 1, wherein the status of the link is determined as a link failure based on at least one of received power of a reference signal for transmission channel measurement being less than or equal to a predetermined threshold or Acknowledgement (ACK)/Negative Acknowledgement (NACK) response not being received within a predetermined period from the second terminal.

3. The method of claim 1, wherein the link between the first terminal and the second terminal is established based on at least one of a unicast service or a multicast service between the first terminal and the second terminal.

4. The method of claim 1, wherein the measurement is aperiodically triggering based on the second message.

5. The method of claim 1, wherein the second message is transmitted using at least one of higher layer signaling or downlink control information.

6. The method of claim 1, wherein the link between the first terminal and the second terminal includes a vehicle to vehicle link between the first terminal and the second terminal.

7. A first terminal configured for re-establishing a link with a second terminal in a wireless communication system, the first terminal comprising:

a transceiver for transmitting and receiving a radio signal; and a processor functionally connected to transceiver, wherein the processor is configured to control to:

determine a radio a status of the link failure for a radio link with a between the first terminal and the second terminal, control the transceiver to transmit, to a base station, (i) a first message for requesting a measurement for re-establishing the link and (ii) information for identifying the second terminal, based on link recovery between the first terminal and the second terminal being required according to the determined status, control the transceiver to receive, from the base station, (i) a second message for triggering the measurement and (ii) information related to a reference signal for the link recovery, control the transceiver to receive, from the second terminal, the reference signal for the link recovery, perform the measurement based on the reference signal for the link recovery; and re-establish the link based on a value of the measurement being greater than or equal to a threshold;

wherein the processor is further configured to:

control the transceiver to transmit, to the base station, at least one scheduling request; and control the transceiver to transmit, to the base station, data to be transmitted to the second terminal, based on the link recovery between the first terminal and the second terminal being required, wherein a location in which the information for identifying the second terminal is included is determined based on a number of scheduling requests transmitted by the first terminal, and wherein based on a plurality of scheduling requests being transmitted, the information for identifying the second terminal is included in the data.

8. The method of claim 1, further comprising:

transmitting, to the base station, a third message including a report on the re-established link between the first terminal and the second terminal.

9. The method of claim 1, wherein based on the link recovery between the first terminal and the second terminal being required, the method further comprising:

receiving, from the base station, a response to the at least one scheduling request;

transmitting, to the base station, a buffer status report BSR; and receiving, from the base station, an uplink grant including resource allocation information for the data to be transmitted to the second terminal, wherein the data to be transmitted to the second terminal is transmitted to the base station based on the uplink grant.

10. The method of claim 1 wherein the information identifying the second terminal comprises a Radio Network Temporary Identifier (RNTI) related to the second terminal.

11. The method of claim 9, wherein based on a single scheduling request being transmitted, the information identifying the second terminal is included in the BSR.

12. The method of claim 1, wherein the reference signal from the second terminal is transmitted based on resources allocated by the base station to the second terminal.

\* \* \* \* \*